(12) United States Patent
Weizman et al.

(10) Patent No.: US 9,924,358 B2
(45) Date of Patent: Mar. 20, 2018

(54) BLUETOOTH VOICE PAIRING APPARATUS AND METHOD

(71) Applicant: Intel IP Corporation, Santa Clara, CA (US)

(72) Inventors: Raz Weizman, Beer Sheva (IL); Liraz Goldenthal, Ramat-Gan (IL); Alex Itkin, Rishon Le-Zion (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/089,514

(22) Filed: Apr. 2, 2016

(65) Prior Publication Data

US 2017/0289798 A1 Oct. 5, 2017

(51) Int. Cl.
| H04M 1/66 | (2006.01) |
| H04W 12/06 | (2009.01) |
| H04W 4/00 | (2018.01) |
| H04L 29/06 | (2006.01) |
| G06F 21/44 | (2013.01) |
| H04W 12/04 | (2009.01) |

(52) U.S. Cl.
CPC .......... H04W 12/06 (2013.01); G06F 21/445 (2013.01); H04L 63/062 (2013.01); H04L 63/0876 (2013.01); H04L 63/18 (2013.01); H04W 4/008 (2013.01); H04W 12/04 (2013.01)

(58) Field of Classification Search
None
See application file for complete search history.

(56) References Cited

U.S. PATENT DOCUMENTS

| 8,711,656 B1 | 4/2014 | Paulson | |
| 2005/0010417 A1* | 1/2005 | Holmes | H04M 1/6066 704/275 |
| 2008/0268776 A1 | 10/2008 | Amendola | |
| 2011/0221590 A1* | 9/2011 | Baker | A61B 5/0002 340/539.12 |
| 2012/0019379 A1* | 1/2012 | Ben Ayed | G08B 13/1436 340/539.1 |

(Continued)

OTHER PUBLICATIONS

Claudio Soriente, et al. "HAPADEP: Human-Assisted Pure Audio Device Pairing", International Association for Cryptologic Research, vol. 20070322, Mar. 13, 2007, pp. 1-11.

(Continued)

*Primary Examiner* — Shantell L Heiber
(74) *Attorney, Agent, or Firm* — Schiff Hardin LLP (57) ABSTRACT

A method and apparatus for authenticating a wireless connection between a first device and a second device. In a first aspect, the first device generates a changing passkey code and converts the passkey code to an audio file that is played through a speaker of the first device as an audible signal. A user hears the audible signal and enters the passkey code into a keyboard of the second device. The second device sends the entered code to the first device for authentication. In a second aspect, the first device generates a passkey code and displays the code on a screen. A user speaks the code aloud to a microphone on the second device. The second device converts the speech into text and then sends the converted speech to the first device for authentication. If the codes of the first or second aspect match, the wireless connection is authenticated.

6 Claims, 4 Drawing Sheets

(56) References Cited

U.S. PATENT DOCUMENTS

| | | |
|---|---|---|
| 2013/0242706 A1 | 9/2013 | Newsome, Jr. |
| 2014/0046664 A1* | 2/2014 | Sarkar .................. H04W 12/06 704/246 |
| 2014/0064511 A1* | 3/2014 | Desai ................... H04R 1/1041 381/74 |
| 2015/0099466 A1 | 4/2015 | Narendra et al. |
| 2016/0212552 A1* | 7/2016 | Schneider ............ H04R 25/558 |

OTHER PUBLICATIONS

European Search Report dated Jul. 7, 2017 for European Patent Application No. 17159211.6.

* cited by examiner

BLUETOOTH VOICE PAIRING APPARATUS AND METHOD

TECHNICAL FIELD

The present disclosure relates generally to a method and apparatus for pairing devices using wireless communication, and more particularly to a method and apparatus for adding security when pairing devices using wireless communication.

BACKGROUND

Bluetooth is the primary wireless technology used to connect mobile telephones, laptop computers, tablet computers and the like to different accessory devices, such as keyboards, mice, speakers, watches, and headsets. Bluetooth wireless communication is often used to transfer voice data, audio playback data, and different other types of data between mobile phones and their accessories, e.g. headsets, earphones, speakers, etc.

When two devices use Bluetooth technology to pass data between the devices, an encryption and authentication process which is referred to as "Bluetooth Pairing" is used. During Bluetooth Pairing, long term and/or short term keys are exchanged, which are used during the Bluetooth Pairing for encryption and authentication. For example, a link key is generated and shared between the two devices as a shared secret. The link key may be used to encrypt information that is exchanged for example during an asynchronous connectionless link.

The pairing procedure is the most vulnerable part of the data exchange in terms of link security. The link is not secure in the beginning of the pairing procedure. The lack of a secure link at this stage allows a potential attacker to receive and understand all communication between the two sides. In addition, the different keys that may be used for security once the link is authenticated are exchanged between the two sides during the pairing procedure. If an attacker were to receive and understand the keys which are exchanged between the two sides during the pairing procedure, the attacker would be able to use the keys to decrypt all future data that is exchanged between the two sides. The attacker may even use the keys to pretend to be one of the two devices. The presence of an attacker that is able to understand the exchanged keys and possibly even take the place of one of the pairing devices means that encryption and authentication between only the desired pairing devices is no longer guaranteed.

The pairing procedure eventually produces a key to be used for all security operations. This key is also known as the "link key". The link key security strength depends most on the association model used during the pairing procedure. The association model chosen for the pairing procedure is an outcome of the input and output capabilities of the pairing devices defined in the Bluetooth Specification [see, for example, Bluetooth Specification Version 4.2 [Vol. 3, Part C] Table 5.7: 10 Capability Mapping to Authentication Stage 1]. For example, a screen may serve as an output device, and a touch screen or a keyboard may serve as an input device.

When one of the pairing devices (the Bluetooth accessory, for instance) has no output capability and no input capability, without considering the capabilities of a second device, two optional association models for pairing the devices can be selected. The first pairing model is named "Just Works." The Just Works association model does not require any user intervention during the pairing process and the devices assume they are the only devices around which are pairing with one another. The second possible association model is "Passkey Entry." In the Passkey Entry association model a constant well-known passkey has to be entered in the phone to pair with the Bluetooth accessory. The same passkey code is used by the user of each device.

Both of the Just Works and Passkey Entry association models are exposed to potential man-in-the-middle (MITM) attacks and are considered unauthenticated. This means that an attacker that has been actively eavesdropping during the pairing procedure may choose to act as a man-in-the-middle MITM and identify itself as the other device towards each of the two pairing devices.

Using the Just Works and Passkey Entry association models during pairing results in the entire connection of the devices being considered unauthenticated and therefore is categorized by the security section of the Bluetooth Specification as low-medium security [see, for example, Bluetooth Specification Version 4.2 [Vol 3, Part C] Table 5.8: Security Level mapping to link key requirements].

Unfortunately, these two association models are the most common ones for pairing between phones and no-screen, no-keyboard accessories such as Bluetooth headsets, earphones and speakers.

Other known solutions like the ones presented in the article of "A comparative study of secure device pairing methods" usually use OOB channel for the association and pairing process. This means that both pairing devices have to be familiar with this specific method instead of using the method in the Bluetooth Specification. Even the method presented in the article named "Loud and Clear" uses only a small portion of the possibilities of using vocal modules for the pairing process.

DETAILED DESCRIPTION

Using different, non-orthodox methods for output and input would allow two Bluetooth devices to pair using a more secured association model such as the "Passkey Entry" model with a changing random passkey. Using this association model will provide the pairing procedure with the highest security level that the Bluetooth Specification grants (High Security, according to the Bluetooth Specification Version 4.2 [Vol 3, Part C] Table 5.8: Security Level mapping to link key requirements). This means that even if an attacker were actively (electronically) eavesdropping during the pairing procedure the attacker would not be able to retrieve the security keys or to identify itself as one of the pairing devices. Therefore an attacker would not be able to break the encryption or the authentication of a Bluetooth link between devices.

The present aspects include two possibilities to use the high security association model for devices which currently use low security association models.

A first aspect uses the "Passkey Entry" model which utilizes the Text-To-Speech functionality of a Bluetooth accessory to audibly play the passkey code. A Text-To-Speech module, and possibly a speaker, may be added if one is not already present in the Bluetooth accessory. Instead of the passkey code being constant as in the prior method, a changing passkey code is generated by the pairing procedure and provided to the user. The user would be required to input the current passkey code as an audibly spoken passkey to the phone using a keyboard on the phone (which could be a physical keyboard or a virtual keyboard displayed on the phone's display screen). Successfully inputting the correct current version of the changing passkey code causes the two devices to associate with one another.

The second aspect also uses the "Passkey Entry" association model, but would be used the other way around. The phone would display the current version of the changing passkey code on the phone screen. The user would see the current passkey code on the phone screen and would be required to say the digits of the current passkey code as audible speech. The device that the user seeks to pair with the phone is provided with a speech recognition module, and possibly a microphone, if it does not already have one or both of these. The speech recognition module in the Bluetooth accessory would transform the audible speech of the user into text digits. The text digits from the speech recognition module would be assembled to form a complete passkey code number and would be sent to the pairing system to complete the pairing procedure if the spoken passkey code is the correct current version.

The present aspects outperform known systems by enabling the high security "Passkey Entry" association model to be used with a changing key. The "Passkey Entry" association model allows the pairing procedure to be authenticated and therefore the pairing procedure produces an authenticated link key to be used in further stages of the connection when passing data between the Bluetooth devices. Using the association model grants the entire connection between the devices the highest security level according to the Bluetooth Specification.

Adding a Text-to-Speech module or a Speech Recognition module to a Bluetooth accessory will not increase the overall complexity of the Bluetooth accessory in a significant manner. Since both the Text-To-Speech and the Speech Recognition modules can be implemented in software, the addition of either or both of these modules to a device should not have any significant effect on the cost or complexity of the device. The present aspects do not require that a Bluetooth accessory which lacks a screen or keyboard be provided with a screen and keyboard merely for providing the increased security in the Bluetooth communication. The addition of one or more new software modules to a device is very simple to implement if the device does not already have such modules. The overall requirements of memory, power consumption or MIPS of the Bluetooth accessory may not be changed due to this minor addition, nor need the device be made more complicated. The voice recognition Speech To Text (STT) and Text To Speech (TTS) software modules, once either or both are added to the device, provide additional output and input capabilities for the device that may be used for other functions. The utilization of either of these modules in the pairing procedure offers significant advantage over existing pairing solutions.

Two aspects with utilize the high security association model for the authentication stage of the Bluetooth pairing will be described. Each of the aspects of the association model may use Bluetooth accessories without a screen and without a keyboard. Instead, the models use a Text-To-Speech module for output purposes or a Speech Recognition module for input purposes. The pairing procedure is initiated by one of the pairing devices to the second device. For terminology the present application will name the first device as the pairing initiator and will name the second device as the pairing responder (which is the same terminology as in the Bluetooth Specification). The aspects do not change or modify the pairing procedure as defined by the Bluetooth Specification at all. The aspects only enable devices which so far have not been able to use the high security association model to now use the high security model.

The first and second aspects use the "Passkey Entry" association model. This association model starts with the exchange of the pairing devices' public keys. After the exchange of the public keys the pairing initiator outputs a random generated passkey on its output means. The user is expected to input the same passkey code into the pairing responder using an input to the pairing responder device. For example, the user may manually input the same passkey using the input means of the pairing responder. The pairing procedure continues by comparing each bit of the passkey. After confirming that all of the bits are equal, the devices are considered authenticated.

Figure 1:
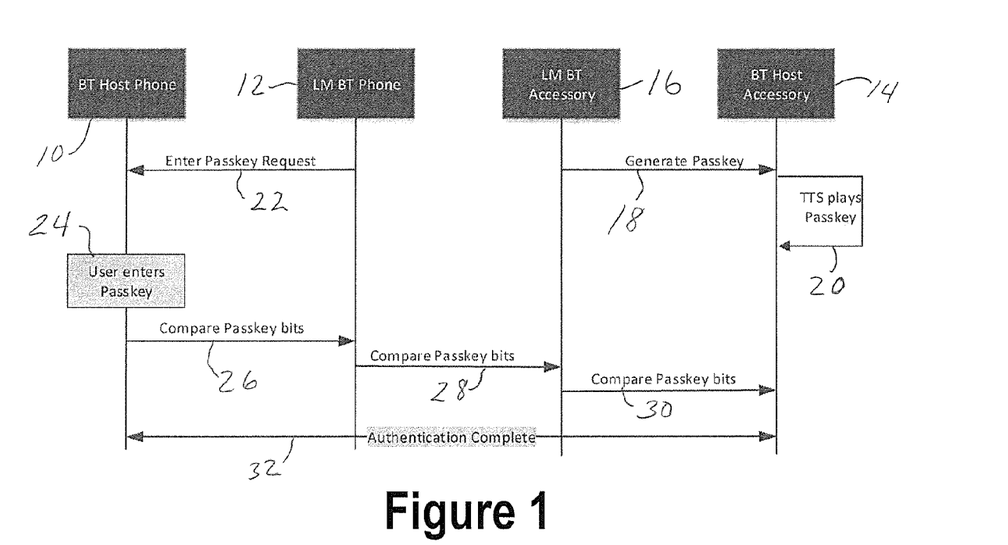
FIG. 1 is a block diagram showing communications used in pairing of Bluetooth devices according to a first aspect.

The first aspect as shown in FIG. 1 uses the "Passkey Entry" association model. A Bluetooth host phone (labeled BT Host Phone) 10 has a link manager (labeled LM BT Phone) 12. A Bluetooth accessory (labeled BT Host Accessory) 14 has a link manager (labeled LM BT Accessory) 16. The pairing of the phone 10 and the accessory 14 is begun by setting one of the devices to discoverable mode and the other device to searching mode. Once the devices have found one another, a prompt for a passkey is activated. In this figure, the link manager 16 of the Bluetooth accessory 14 recognizes the passkey prompt and generates a passkey code. The generated passkey code is transmitted from the link manager 16 to the Bluetooth accessory 14 as shown at 18. The passkey code is a changing passkey code that may be different each time these devices are paired, or at least are not the same each time these devices are paired.

An integrated Text-To-Speech module (indicated as TTS in the drawing) in the accessory 14 receives the passkey code and converts the digits of the code into an audio file, which can also be a sequence of audio files, which correspond to the digits of the passkey code. The audio file is an audio signal of the spoken digits of the passkey code. The accessory plays the audio file as an audible output of the accessory so that it can be heard by a user. For example, the audio file may be played through a speaker of the accessory. The text to speech conversion and playing of the audio file are shown in the drawing at 20.

The prompt for a passkey code after the devices have found one another causes the link manager 12 of the phone 10 to generate a passkey request that is sent to the phone 10 as shown at 22. The phone 10 presents to the user a request for the passkey code, for example on the display of the phone 10. When the accessory 14 plays the audio file of the code at 20, the user may hear the audible digits of the passkey code and may enter the digits into the input of the phone 10, as shown at 24. For example, the user may enter the passkey digits into the phone keyboard. The phone keyboard by which the user enters the passkey code may be by a physical keyboard on the phone or may be a virtual keyboard for example as shown on the screen of the phone.

The rest of the association model would continue the same as described in the Bluetooth Specification. In particular, the host phone 10 sends a command to the link manager 12 of the phone to compare the passkey bits entered by the user into the phone 10 to the current passkey code, as shown at 26. The link manager 12 of the phone sends a compare passkey bits communication 28 to the link manager 16 of the accessory. The link manager 16 of the accessory sends a compare passkey bits communication 30 to the host accessory 14. If the passkey bits as entered by the user into the phone 10 match the passkey bits as generated by the accessory 14 and as played as an audio file by the accessory (in other words, it is the current passkey), the authentication is complete as indicated at 32. Once authentication is complete, the Bluetooth connection and communications may proceed according to the Bluetooth Specification.

To use this association model, the Bluetooth accessory 14 need only have an output capability, and need not have other I/O (input or output) capabilities. According to the first aspect as shown in FIG. 1, the "Passkey Entry" association model uses a Text-To-Speech module on the Bluetooth accessory 14 to play the changing passkey code as an audio output.

Figure 2:
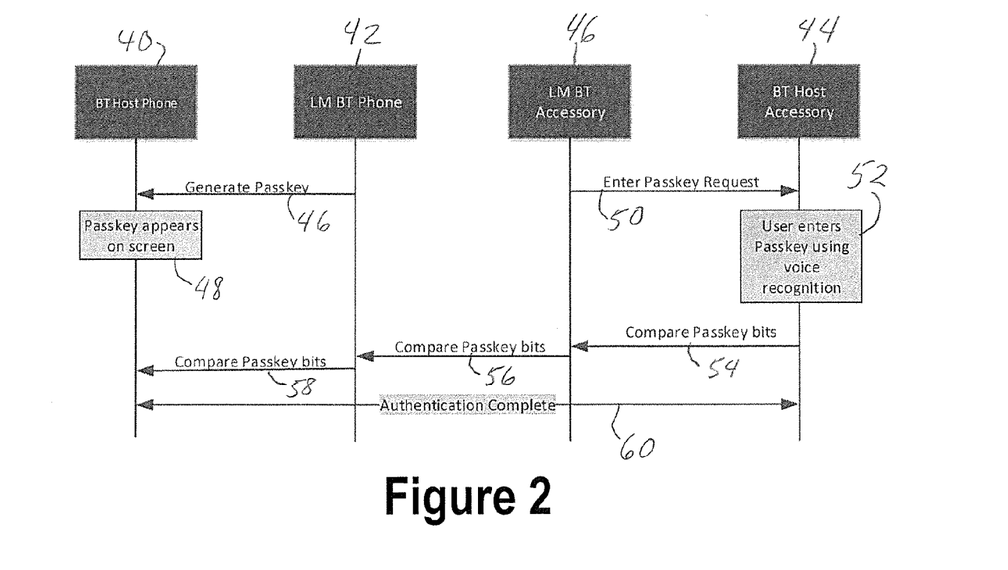
FIG. 2 is a block diagram showing communications used in pairing of Bluetooth devices according to a second aspect.

The second aspect as shown in FIG. 2 also uses the "Passkey Entry" association model but in a different way. This aspect can be used only with device that has a microphone or that is provided with a microphone. In FIG. 2, a Bluetooth host phone 40 (labeled as BT Host Phone) has a link manager (labeled as LM BT Phone) 42. A Bluetooth accessory device (labeled as BT Host Accessory) 44 has a link manager (labeled as LM BT Accessory) 46. The pairing of the phone 40 and the accessory 44 is begun by setting one of the devices to discoverable mode and the other device to searching mode. Once the devices have found one another, a prompt for a passkey is activated. The link manager 42 of the phone 40 sends a communication to the phone 40 to generate a passkey code as shown at 46. The phone 40 generates a changing passkey code and displays the current passkey code on phone display screen as shown at 48.

The discovery of the devices by each other and the passkey prompt activation results in the accessory link manager 46 sending a pass key request to the accessory 44, as shown at 50. The accessory 44 awaits an audio signal as the user speaks the current passkey code. As shown at block 52, the user reads aloud the passkey digits so that the spoken digits are detected by a microphone of the Bluetooth accessory 44. The Bluetooth accessory 44 includes a Speech Recognition module operates to transform the speech into text. The sequence of spoken digits is transformed from an audio stream into a sequence of text numbers in the Bluetooth accessory 44 as a passkey code in text format. The rest of the association model would continue the same as described in the Bluetooth Specification. In particular, the Bluetooth host accessory 44 sends a communication 54 to the link manager 46 to compare the passkey code that was received by the accessory 44 to the passkey code sent by the phone 40. The link manager 46 of the accessory 44 sends a communication 56 to the link manager 42 of the phone 40 to compare the passkey code that was received by the accessory 44 to the passkey code sent by the phone 40. The link manager 42 of the phone 40 sends a communication 58 to the host phone 40 to compare the passkey code that was received by the accessory 44 to the passkey code sent by the phone 40. If the passkey code received by the accessory 44 as spoken digits and converted to text matches the passkey code displayed by the phone 40, the Bluetooth connection is considered authenticated. As shown at 60 the authentication is complete and the communications can proceed.

A Bluetooth accessory need only have input capabilities to use this association model, and need not have other I/O capabilities. The aspect shown in FIG. 2 requires a Speech to Text module on the Bluetooth accessory to use of the "Passkey Entry" association model. A Speech Recognition component that performs a Speech-To-Text function requires only a bit more sophistication on the Bluetooth accessory side but is also rather simple to implement in software and doesn't require any additional hardware.

The present aspects have been described as used with Bluetooth wireless communications. It is foreseen that the present association model aspects may be used for authentication of other wireless technologies as well.

Figure 3:
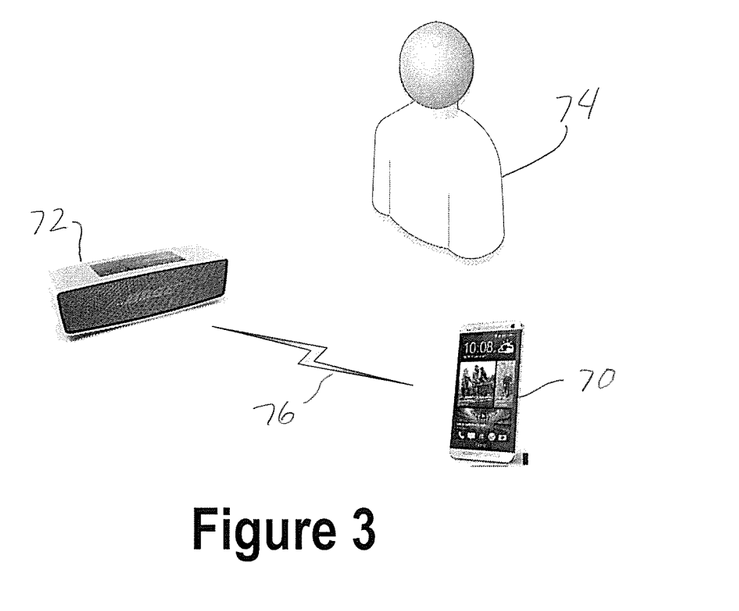
FIG. 3 is a schematic illustration of a smart phone pairing with a Bluetooth wireless speaker accessory.

FIG. 3 shows an example of a smart phone 70 and a Bluetooth enabled accessory 72 that a user 74 wishes to link wirelessly. In this example, the accessory 72 is a wireless speaker. An example of a Bluetooth enabled smart phone and Bluetooth enabled speaker are shown for purposes of illustrating the present aspects. The present aspects are not limited to the illustrated example. Any smart phone or other phone, tablet computer, laptop computer, netbook computer, notebook computer, desktop computer, workstation computer, server computer, personal digital assistant, music player device, or other mobile or stationary electronic device or any other Bluetooth enabled device may be used in the present aspect. Similarly, any Bluetooth enabled accessory or other device may be used as the accessory in the present aspects. Further, the present aspects refer to Bluetooth wireless communications but the aspects are not limited to Bluetooth technology and may be utilized in other wireless communications.

According to the first aspect as shown in FIG. 1, the speaker accessory 72 may generate the changing passkey code, convert it to an audio file and play the audio file of the passkey code so that the user 74 may hear it. The user 74 may enter the passkey code into the smartphone 70. Communications as shown in FIG. 1 result in authentication of the accessory 72 and phone 70 for a Bluetooth link 76 between the two devices if the user-entered passkey code matches the passkey code played audibly by the speaker 72.

Alternately, the link 76 may be established according to the second aspect. Again with reference to FIG. 3, the smart phone 70 may display a passkey code on its screen. The user 74 speaks the displayed code aloud so that the spoken code is detected by the accessory 72. The accessory 72 detects the spoken code and converts the spoken code into text. Communication of the passkey code as text according to FIG. 2 back to the phone 70 provides a determination as to whether the passkey code of the phone 70 and the code received by the accessory 72 from the user match. If they codes match, the wireless connection 76 is established.

Figure 4:
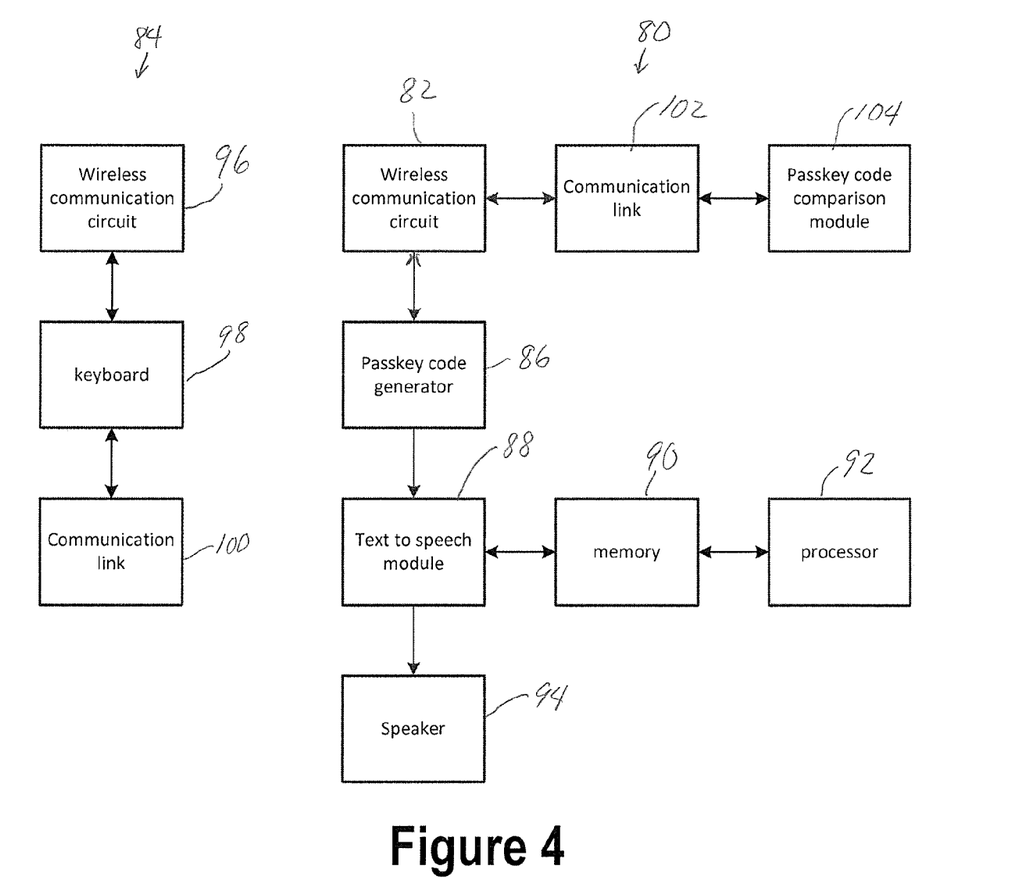
FIG. 4 is a functional block diagram of a smart phone and a Bluetooth accessory according to the first aspect.

Turning to FIG. 4, a wireless accessory 80 has a wireless communication circuit 82 that detects that the accessory has been discovered by a smart phone 84 or that has discovered a smart phone 84. A passkey code generator 86 in the accessory 80 generates a changing passkey code. The generated passkey code is sent to a text to speech module 88. The text to speech module 88 may be a program that is stored in memory 90 and that is executed by a processor 92. The output of the text to speech module 88 is an audio file that is played through a speaker 94. A user hears the output of the speaker 94 as an audible representation of the passkey code.

The smart phone 84 has a wireless communication circuit 96 that detects that the smart phone 84 has been discovered by the accessory 80 or has discovered the accessory 80. A keyboard 98 awaits an input from the user. The user inputs a sequence of digits on the keyboard 98. If entered correctly by the user, the sequence of digits entered into the keyboard is the same sequence of digits as the audible output of the speaker 94. A communication link 100 sends the entered sequence of digits from the smart phone 84 to a communication link 102 in the accessory 80. The accessory has a passkey code comparison module 104 that compares the sequence of digits received by the communication link 102 to the passkey code generated by the passkey code generator 86. If the digits match, the link is authenticated and can continue as a secure wireless link. The accessory 80 and smart phone 84 of course include other functional elements beyond those shown here, as is known.

Figure 5:
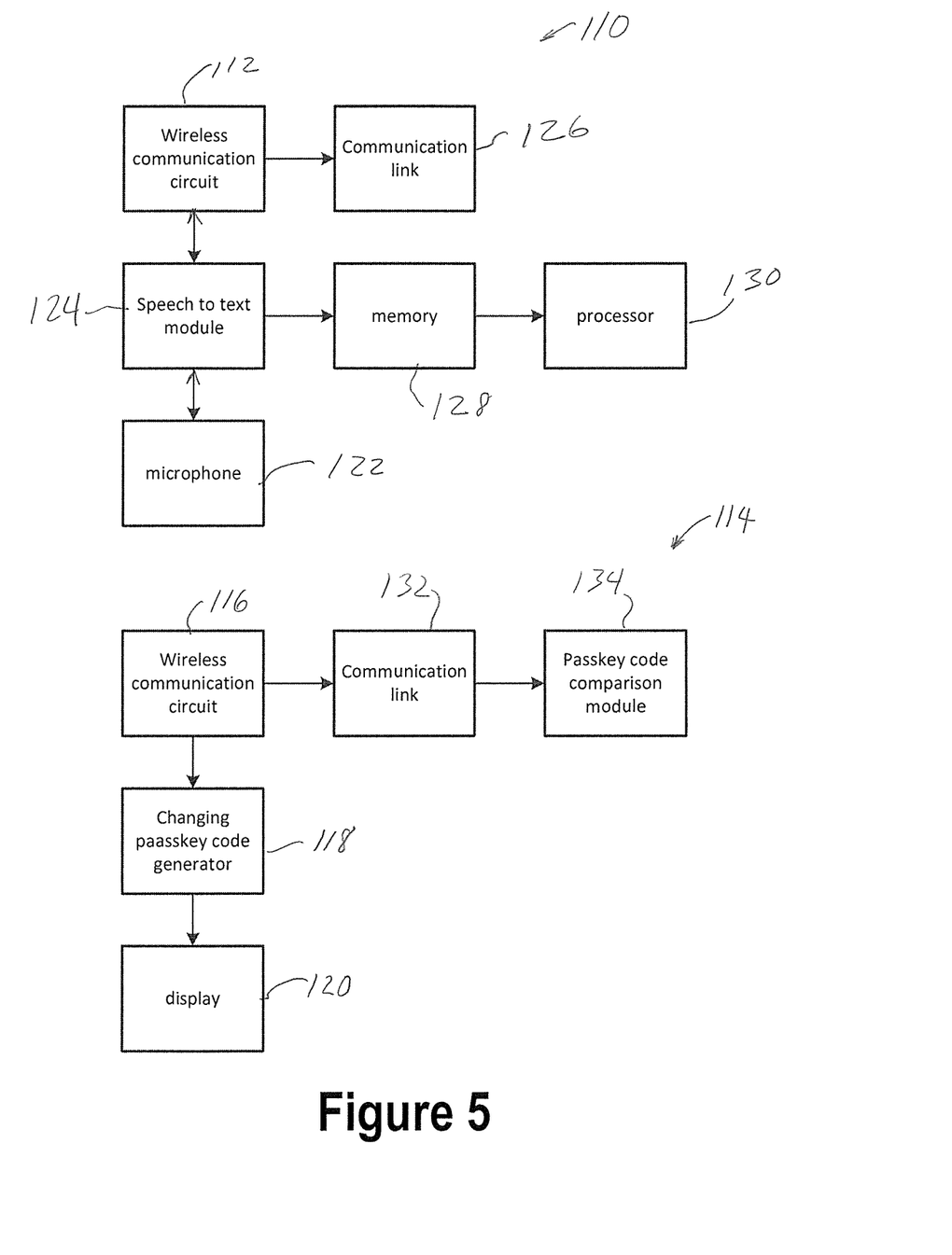
FIG. 5 is a functional block diagram of a smart phone and a Bluetooth accessory according to the second aspect.

With reference to FIG. 5, the second aspect is shown including a wireless accessory 110 that has a wireless communication circuit 112 by which the accessory may be discovered or may discover another device. A smart phone 114 also includes a wireless communication circuit 116. Upon being discovered by the accessory 110 or upon the smart phone 114 discovering the accessory 110, a changing passkey code generator 118 generates a passkey code. The generated code is shown as a sequence of digits on a display 120. The display 120 is viewed by the user who reads the digit sequence aloud so that it is audible.

In the accessory 110, the audible speech of the user is detected by a microphone 122. The signal from the microphone is sent to a speech to text module 124. The module 124 converts the spoken digits into text which are related from the accessory 110 via a communication link 126 to the smart phone 126. As noted above, the speech to text module 124 may be a program stored in memory 128 and executed by a processor 130.

The smart phone 114 receives the digits via a communication link 132 and sends them to a passkey code comparison module 134 for comparison to the generated passkey code. If the digits match, the link is authenticated.

In a first aspect, a method for authenticating a wireless link between a first device and a second device, comprising: initiating a pairing between the first device and the second device; generating a changing passkey code in the first device; first communicating the passkey code from the first device, wherein the first communicating including outputting the passkey code from the first device, the outputting of the passkey code enabling communication of a communicated passkey code from the first device to a second device as an audible signal; second communicating including receiving the communicated passkey code from the second device by the first device for comparison of the communicated passkey code to the generated passkey code in the first device; and if the communicated passkey code matches the generated passkey code, authenticating the pairing of the first device and the second device.

In a second aspect, a method according the first aspect, wherein the first communicating includes outputting of an audible signal representing the passkey code from the first device.

In a third aspect, a method according to the second aspect, wherein the outputting of the audible signal includes converting text of the passkey code generated by the first device into a speech signal, and playing the speech signal as the audible signal from the first device.

In a fourth aspect, a method according to the second aspect, wherein the second communicating includes receiving at the first device the passkey code that has been input into the second device as a physical input by a user.

In a fifth aspect, a method according to the first aspect, wherein the second communicating includes receiving by the first device a passkey code that has been input into the second device as an audible signal.

In a sixth aspect, a method according to the fifth aspect, wherein the first communicating includes displaying the passkey code on the first device.

In a seventh aspect, a method according to a sixth aspect, wherein the displaying includes displaying a text representation of the passkey code on a screen of the second device.

In an eighth aspect, method for authenticating a wireless link between a first device and a second device, comprising: initiating a pairing between the first device and the second device; generating a changing passkey code in the first device as a text string; converting the text string into an audio file corresponding to the passkey code in the first device; playing the audio file by the first device as an audible output; receiving a communicated passkey code by the first device for comparison to the passkey code generated in the first device, the communicated passkey code being received from a second device at which the communicated passkey code was input as a physical input; and if the communicated passkey code matches the generated passkey code, authenticating the pairing of the first device and the second device.

In a ninth aspect, method for authenticating a wireless link between a first device and a second device, comprising: initiating a pairing between the first device and the second device; generating a changing passkey code in the first device; displaying the passkey code on the first device; receiving a communicated passkey code from the second device by the first device, wherein the communicated passkey code has been received at the second device as an audible signal representing the passkey code and converted from the received audible signal in the second device into a text string representing the received audible signal; and if the communicated text string matches the generated passkey code, authenticating the pairing of the first device and the second device.

In a tenth aspect, wherein the displaying includes displaying the passkey code as a text string on a display screen of the first device.

In an eleventh aspect, a first device for wireless communication with a second device, comprising: a wireless communication circuit in the first device, the wireless communication circuit being operable in at least one of a first and second mode, the first mode being a discoverable mode and the second mode being a searching mode; a changing passkey code generator in the first device, the changing passkey code being operable to generate a passkey code upon the first device discovering the second device or the second device discovering the first device, the passkey code including a text string; a text to speech module in the first device, the text to speech module being operable to produce an audio file from the text string of the passkey code; and a speaker in the first device, the speaker being connected to receive the audio file from the text to speech module and being operable to play the audio file as an audible signal.

In a twelfth aspect, a first device according to the eleventh aspect, wherein the text to speech module includes a memory in the first device in which is stored a text to speech program, and a processor in the first device that is connected to receive the text to speech program from the memory and that is operable to execute the text to speech program.

In a thirteenth aspect, a first device according to the eleventh aspect, further comprising: a communication link for receiving at the first device a communication from the second device, the communication including a communicated passkey code received by the second device, the communicated passkey code being received for comparison with the passkey code generated by the first device.

In a fourteenth aspect, a method according to the eleventh aspect, wherein the first device is one of a wireless speaker, a headset, a headphone, earphones, a keyboard, a computer mouse, a pointing device, and a watch.

In a fifteenth aspect, a first device for wireless communication with a second device, comprising: a wireless communication circuit in the first device, the wireless communication circuit being operable in at least one of a first and second mode, the first mode being a discoverable mode and the second mode being a searching mode; a microphone in the first device; a speech to text module connected to the microphone, the speech to text module being operable to convert an audible signal representing a passkey code to a text string; and a communication link operable for sending the text string generated by the speech to text module in the first device to the second device.

In a sixteenth aspect, a first device according to a fifteenth aspect, wherein the first device is one of a wireless speaker, a headset, a headphone, earphones, a keyboard, a computer mouse, a pointing device, and a watch.

In a seventeenth aspect, a mobile phone for use with a secure wireless connection, comprising: a wireless communication circuit in the mobile phone, the wireless communication circuit being operable in at least one of a first mode and a second mode, the first mode being a discoverable mode and the second mode being a searching mode, the wireless communication circuit being operable to generate a request for a changing passkey code upon the mobile phone discovering a second device or upon the second device discovering the mobile phone; a physical input of the mobile phone, the physical input being operable for receiving the changing passkey code from a user of the phone; and a communication circuit for transmitting the received changing passkey code to the second device for authentication.

In an eighteenth aspect, a mobile phone according to a seventeenth aspect, wherein the physical input includes one of a virtual keyboard and a physical keyboard.

In a nineteenth aspect, a mobile phone for use with a secure wireless connection, comprising: a wireless communication circuit in the mobile phone, the wireless communication circuit being operable in at least one of a first mode and a second mode, the first mode being a discoverable mode and the second mode being a searching mode; a passkey code generator in the mobile phone, the passkey code generator being operable to generate a changing passkey code upon the mobile phone discovering a second device or upon the second device discovering the mobile phone; a display device in the mobile phone, the display device being operable to display the passkey code generated by the passkey code generator; and a communication circuit for receiving a passkey code from a second device for comparison to the passkey code generated by the passkey code generator in the mobile phone.

While the foregoing has been described in conjunction with exemplary aspect, it is understood that the term "exemplary" is merely meant as an example, rather than the best or optimal. Accordingly, the disclosure is intended to cover alternatives, modifications and equivalents, which may be included within the scope of the disclosure.

Although specific aspects have been illustrated and described herein, it will be appreciated by those of ordinary skill in the art that a variety of alternate and/or equivalent implementations may be substituted for the specific aspects shown and described without departing from the scope of the present application. This application is intended to cover any adaptations or variations of the specific aspects discussed herein.

The invention claimed is:

1. A method for authenticating a wireless link of a first device comprising:
    initiating a pairing with a second device;
    generating a changing passkey code;
    displaying the passkey code;
    receiving a communicated passkey code from the second device, wherein the communicated passkey code has been received at the second device as an audible signal representing the displayed passkey code and converted from the received audible signal in the second device into a text string representing the received audible signal; and
    if the communicated text string matches the generated passkey code, authenticating pairing of the first device with the second device.

2. A method as claimed in claim 1, wherein the displaying includes displaying the passkey code as a text string on a display screen.

3. A first device for wireless communication, comprising:
    a wireless communication circuit, the wireless communication circuit being operable in at least one of a first and second mode, the first mode being a discoverable mode and the second mode being a searching mode;
    a changing passkey code generator, the changing passkey code being operable to generate a passkey code upon the first device discovering a second device or upon the first device being discovered by the second device, the passkey code including a text string;
    a text to speech module, the text to speech module being operable to produce an audio file from the text string of the passkey code; and
    a speaker connected to receive the audio file from the text to speech module and being operable to play the audio file as an audible signal;
    the wireless communication circuit being operable to receive from the second device a passkey code corresponding to the audio signal played by the speaker and which was received at the second device as a physical input.

4. A first device as claimed in claim 3, wherein the text to speech module includes a memory in which is stored a text to speech program, and a processor that is connected to receive the text to speech program from the memory and that is operable to execute the text to speech program.

5. A first device as claimed in claim 3, further comprising:
    a communication link for receiving a communication from the second device, the communication including a communicated passkey code received by the second device, the communicated passkey code being received for comparison with the generated passkey code.

6. A first device as claimed in claim 3, wherein the first device is one of a wireless speaker, a headset, a headphone, earphones, a keyboard, a computer mouse, a pointing device, and a watch.

* * * * *